Patented Aug. 19, 1924.

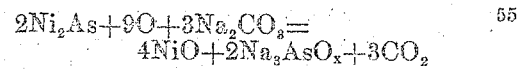

UNITED STATES PATENT OFFICE.

CLARENCE P. LINVILLE, OF ELIZABETH, NEW JERSEY, ASSIGNOR TO AMERICAN SMELTING AND REFINING COMPANY, OF NEW YORK, N. Y., A CORPORATION OF NEW JERSEY.

PRODUCTION OF ARSENATES FROM SPEISS.

No Drawing. Application filed April 13, 1921. Serial No. 462,388.

*To all whom it may concern:*

Be it known that I, CLARENCE P. LINVILLE, a citizen of the United States, and resident of Elizabeth, in the county of Union and State of New Jersey, have invented certain new and useful Improvements in the Production of Arsenates from Speiss, of which the following is a specification.

The invention relates in general to a process for treating nickel speiss for the purpose of extracting the arsenic and other metals therefrom in a form suitable for marketable purposes.

Among the objects of the invention are to simplify the known methods of treating nickel speiss, to reduce the time and temperature necessary to effect the roasting, to complete the process with one treatment and to eliminate certain objections which have characterized the use of caustic soda in prior processes.

Another object of this invention is to provide a simple process by means of which practically all of the arsenic is removed directly from the speiss, economically and in a way which will permit of the separation of the other metals without deleterious contamination.

Broadly I attain the invention by roasting the speiss with an excess of sodium carbonate and dissolving out of the roast the resulting tri-sodium arsenate.

Various other objects and advantages of the invention will be obvious from the following particular description of one method of practicing the invention.

It is understood that the speiss herein referred to consists largely of arsenic and iron with more or less of other metals such as lead, copper, nickel, cobalt, as well as some of the precious metals.

One method for practicing the process herein set forth is to mix nickel speiss preferably in a finely ground state with sufficient soda ash (sodium carbonate) to effect the desired reaction and then to subject the mixture to a thorough roasting. Nothing else is added to the mixture so that the reaction is dependent entirely upon the presence of the soda ash reacting on the speiss during the roasting operation. It is believed that the reaction can be expressed as follows:—

$$2Ni_2As + 9O + 3Na_2CO_3 = 4NiO + 2Na_3AsO_x + 3CO_2$$

The soda ash is in an amount sufficient to combine with all of the antimony and arsenic present with perhaps a small excess and in one instance an amount of soda ash equal to seventy-five percent by weight of the speiss was added. The arsenic present in the speiss combines with the soda ash forming soluble tri-sodium arsenate. The roast is then dissolved which places the tri-sodium arsenate in solution, leaving a residue carrying all the other elements which were present in the speiss, including the insoluble sodium antimonate.

The tri-sodium arsenate thus recovered is of a high grade of purity and can be marketed as such, or by a known treatment with calcium hydroxide it may be used to produce the tri-calcium arsenate which also has a marketable value.

The residue of arsenic free roasted speiss can then be treated with hot concentrated sulphuric acid which dissolves out the iron, copper, nickel and cobalt as sulphates and leaves a residue containing the lead, antimony, gold, and silver which may be treated by usual methods to recover these values.

It is possible by the use of the soda roast herein suggested to obtain a complete roasting of the speiss at a lower temperature than has been possible heretofore in treating speiss to extract the arsenic. The sodium carbonate also acts as a diluting agent and assists the roasting by making the charge more loose allowing a better access of air than by known processes and preventing fusion or sintering of the speiss.

The solubility of the copper-nickel-cobalt group of metals from the arsenic free residue is increased due to the prior elimination of the arsenic thus enabling better leaching with sulphuric acid and allowing a reduction over any previously practiced methods of the amount of residues necessary to be treated. Further the arsenic present in the solution is almost wholly in the "ic" form and only a trace of the "ous" form is present. There has been eliminated in this process the necessity for handling arsenic gases with their obvious danger to workmen and apparatus; and the use of expensive nitric acid heretofore regarded as necessary has been eliminated.

Having thus described my invention, I claim:

1. In the art of treating nickel speiss, the process which consists in air roasting the speiss in the presence of sodium carbonate supplied in an amount in excess of the amount necessary to convert the arsenic present into an arsenate, and disssolving the roast with water to obtain a solution of tri-sodium arsenate and to obtain the other metals in a residue substantially free of arsenic.

2. In the art of abstracting the arsenic directly from nickel speiss in one roasting operation, the process which consists in roasting the speiss solely with sodium carbonate and dissolving the resulting tri-sodium arsenate from the roast.

3. In the art of treating speiss, the process which consists in roasting the speiss without pre-roasting and without pre-oxidizing, in the presence of sodium carbonate to form a water soluble arsenate.

4. The process which consists in mixing sodium carbonate with speiss, subjecting the mixture to a single oxidizing roast in the presence of air supplied in sufficient volume to effect the necessary oxidizing reaction and dissolving the resulting tri-sodium arsenate from the roast.

5. The process which consists in mixing sodium carbonate with speiss in an amount sufficient to combine with all of the arsenic and antimony present, air roasting the mixture and dissolving the resulting tri-sodium arsenate from the roast.

6. In the art of treating speiss, the method which consists in roasting the speiss in the presence of sodium carbonate as the sole reagent and with free access of air at a temperature sufficiently low to prevent fusion.

Signed this 5th day of April, A. D. 1921.

CLARENCE P. LINVILLE.